United States Patent
Peloux et al.

(10) Patent No.: US 12,502,062 B2
(45) Date of Patent: Dec. 23, 2025

(54) METHOD FOR DETERMINING AT LEAST ONE PARAMETER OF AN EYE OF A PERSON

(71) Applicant: Essilor International, Charenton-le-pont (FR)

(72) Inventors: Marius Peloux, Charenton-le-Pont (FR); Stéphane Boutinon, Charenton-le-Pont (FR); Vincent Roptin, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 729 days.

(21) Appl. No.: 17/760,113

(22) PCT Filed: Feb. 5, 2021

(86) PCT No.: PCT/EP2021/052851
§ 371 (c)(1),
(2) Date: Aug. 4, 2022

(87) PCT Pub. No.: WO2021/156467
PCT Pub. Date: Aug. 12, 2021

(65) Prior Publication Data
US 2023/0016503 A1    Jan. 19, 2023

(30) Foreign Application Priority Data
Feb. 7, 2020 (EP) .................................... 20305117

(51) Int. Cl.
*A61B 3/032* (2006.01)
*A61B 3/18* (2006.01)
*G02C 7/02* (2006.01)

(52) U.S. Cl.
CPC ............... *A61B 3/032* (2013.01); *A61B 3/18* (2013.01); *G02C 7/027* (2013.01)

(58) Field of Classification Search
CPC ......... A61B 3/032; A61B 3/18; A61B 3/0033; A61B 3/028; A61B 3/0025; A61B 3/10;
(Continued)

(56) References Cited

U.S. PATENT DOCUMENTS 6,099,125 A    8/2000 Webb et al.
2003/0231284 A1    12/2003 Lee et al.
(Continued)

FOREIGN PATENT DOCUMENTS

JP          3-1834 A       1/1991
WO    WO 2012/154278 A1   11/2012
WO    WO 2018/091984 A1    5/2018

OTHER PUBLICATIONS

International Search Report & Written Opinion issued May 10, 2021 in PCT/EP2021/052851, filed on Feb. 5, 2021, 12 pages.

*Primary Examiner* — Travis S Fissel
(74) *Attorney, Agent, or Firm* — Oblon, McClelland, Maier & Neustadt, L.L.P.

(57) ABSTRACT

A method for determining at least one optical parameter of an eye of a person comprising displaying at least two sharp images on a retina of the eye of the person, the at least two images comprising a target and being carried by two light beams focused substantially in the plane of a pupil of the eye at at least two different positions, adapting a parameter of the target in each image based on feedback of the person relative to the change of the parameter of the target in the image, and determining the at least one optical parameter of the person's eye based on the adaption of the parameter of the target in each image.

13 Claims, 7 Drawing Sheets

(58) Field of Classification Search
CPC ....... A61B 3/103; A61B 3/1035; A61B 3/107;
A61B 3/14; A61B 3/15; A61B 3/0285;
G02C 7/027; G02C 7/025
USPC ......................................................... 351/200
See application file for complete search history.

(56) References Cited

U.S. PATENT DOCUMENTS

| | | |
|---|---|---|
| 2005/0134799 A1 | 6/2005 | Thompson et al. |
| 2010/0231855 A1 | 9/2010 | Thompson et al. |
| 2011/0242483 A1 | 10/2011 | Shea et al. |
| 2015/0374233 A1* | 12/2015 | Zhang ..................... A61B 3/14 351/246 |
| 2016/0033771 A1 | 2/2016 | Tremblay et al. |
| 2018/0136486 A1* | 5/2018 | Macnamara ............. A61B 3/00 |
| 2020/0073143 A1 | 3/2020 | Macnamara et al. |

\* cited by examiner

Case A        Case B        Case C

METHOD FOR DETERMINING AT LEAST ONE PARAMETER OF AN EYE OF A PERSON

FIELD OF THE INVENTION

The invention relates to a method for determining at least one parameter of an eye of a person. The invention further relates to a method for displaying a sharp image on the retina of an eye of a person.

BACKGROUND OF THE INVENTION

An optical lens is generally determined to be then manufactured in accordance with the wearer specifications. In the case, for example, of an ophthalmic lens for the correction or improvement of eyesight, the ophthalmic lens is determined according to a wearer prescription corresponding to the visual requirements of that wearer.

The ophthalmic prescription can include a positive or negative power prescription as well as an astigmatism prescription. These prescriptions correspond to corrections enabling the wearer of the lenses to correct defects of his vision.

Today's optometrists use accurate but cumbersome devices which require a rather long and not practical measurement to evaluate the prescription of a wearer.

Particularly in developing countries, optometrists are likely to be rare and rather low-skilled, and may not be able to afford expensive prescription measurement needs.

One object of the present invention is to provide a cheap, simple and very quick prescription measurement method.

SUMMARY OF THE INVENTION

To this end, the invention proposes a method for determining at least one optical parameter of an eye of a person comprising:
  displaying at least two sharp images on a retina of the eye of the person, the at least two images comprising a target and being carried by two light beams focused substantially in the plane of a pupil of the eye at at least two different positions;
  adapting a parameter of the target in each image based on feedback of the person relative to the change of the parameter of the target in the image; and
  determining the at least one optical parameter of the person's eye based on the adaption of the parameter of the target in each image.

Advantageously, such method allows determining easily optical parameters of an eye of a person using an "off-the-shelf" product, which is initially not meant for this application. Those optical parameters are relative to a prescription of the eye, for example dioptric power, astigmatism, axis and potentially higher order aberrations.

Thus, such method provides a non-invasive, easy-to-use, cheap method to perform subjective digital refraction measurements, particularly in developing countries. In the sense of the invention, digital refraction measurement is refraction measurement using digital means.

According to further embodiments which can be considered alone or in combination:
  the adaptation of a parameter of the target in each image based on feedback of the person relative to the change of the parameter of the target in the image is done in order to superimpose the targets of the at least two sharp images; and/or
  at least three sharp images are displayed on the retina of the eye of the person, the at least three images comprising a target and being carried by three light beams focused substantially in the plane of the pupil of the eye at at least three different positions and three optical parameters based on the adaption of the parameter of the target in each focused content are determined; and/or
  the adapted parameter of the target is the relative position of the target in each image;
  adapting a parameter of the target in each image comprises:
    adapting a horizontal angular position of the target of an image carried by one of the light beams until the target of the image and the target of another image carried by another of the light beams are seen by the person with the same horizontal position in the displayed images on the retina of the eye;
    adapting a vertical angular position of the target of an image carried by one of the light beams until the target of the image and the target of another image carried by another of the light beams are seen by the person with the same vertical position in the displayed images on the retina of the eye;
  the adapted parameter of the target is the size of the target in each image; and/or
  adapting a parameter of the target in each image comprising:
    adapting a size of the target of an image carried by one of the light beams in a horizontal direction until the target of the image and the target of another image carried by another of the light beams are seen by the person touching each other in the horizontal direction in the displayed images on the retina of the eye;
    adapting a size of the target of an image carried by one of the light beams in a vertical direction until the target of the image and the target of another image carried by another of the light beams are seen by the person touching each other in the vertical direction in the displayed images on the retina of the eye; and/or
  the determined optical parameters of the person's eye are relative to a dioptric power, an astigmatism and an axis of the eye of the person; and/or
  the feedback of the person is a haptic feedback; and/or
  the feedback of the person is a vocal feedback; and/or
  the feedback of the person is provided by answering to questions; and/or
  the method according to the invention is implemented using a head-mounted device adapted to at least display a plurality of sharp images on the retina of the eye of the person, the plurality of images being carried by a plurality of light beams focused substantially in the plan of the pupil of the eye at different positions.

According to a further aspect, the invention further relates to a device comprising a processor adapted to store one or more sequence of instructions and to carry out at least one of the steps of the method for determining at least one optical parameter of an eye of a person according to the invention.

More particularly, the invention relates to a computer program product comprising one or more stored sequences of instructions that are accessible to a processor and which, when executed by the processor, causes the processor to carry out at least the following steps of the method for determining at least one optical parameter of an eye of a person according to the invention:

displaying at least two sharp images on a retina of the eye of the person, the at least two images comprising a target and being carried by two light beams focused substantially in the plane of a pupil of the eye at at least two different positions;

adapting a parameter of the target in each image based on feedback of the person relative to the change of the parameter of the target in the image; and determining the at least one optical parameter of the person's eye based on the adaption of the parameter of the target in each image.

The invention further relates to a computer readable medium carrying one or more sequences of instructions of the computer program product according to the invention.

Another object of the invention is directed to a method for displaying a sharp image on a retina of an eye of the person, the person having a prescription for the eye of the person, the method comprising:

determining at least one optical parameter relative to the prescription for the eye of the person according to the invention;

providing a plurality of initial sub-images, each initial sub-image corresponding to at least a part of the image to be displayed;

providing a plurality of light beams configured to be focused substantially in the plan of a pupil of the eye at a plurality of corresponding different positions, each light beam being configured to carry an associated sub-image;

for each sub-image, adapting the sub-image based on the at least one provided optical parameter and on the corresponding focused position of the light beam configured to carry the sub-image to form an adapted sub-image; and displaying each adapted sub-image carried by the associated light beam on the retina of the person.

Advantageously, such method allows customizing a head-mounted display device to the user's viewing ability. Indeed, such method allows a pre-compensation of the image to be displayed on the retina of the user based on the prescription of the eye of the user, so as to display a sharp image on the retina of the user.

Consequently, a single head-mounted device could be used by different persons having different prescription, the image to be displayed on the retina of each person being corrected based on a prescription of the eye of the person determined by the same head-mounted device.

According to a further aspect, the invention further relates to a device comprising a processor adapted to store one or more sequence of instructions and to carry out at least one of the steps of the method for displaying a sharp image on a retina of an eye of the person according to the invention.

More particularly, the invention relates to a computer program product comprising one or more stored sequences of instructions that are accessible to a processor and which, when executed by the processor, causes the processor to carry out at least the following steps of the method for displaying a sharp image on a retina of an eye of the person according to the invention.

The invention further relates to a computer readable medium carrying one or more sequences of instructions of the computer program product according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

The present invention relates to a method for determining one optical parameter of an eye of a person. The optical parameters to be determined are relative to a dioptric power, an astigmatism and an axis of the eye of the person.

Such parameters allow determining the ophthalmic prescription of the person's eye. Indeed, the ophthalmic prescription can include a positive or negative power prescription as well as an astigmatism prescription. These prescriptions correspond to corrections enabling the wearer of lenses to correct defects of his/her vision.

Figure 1:
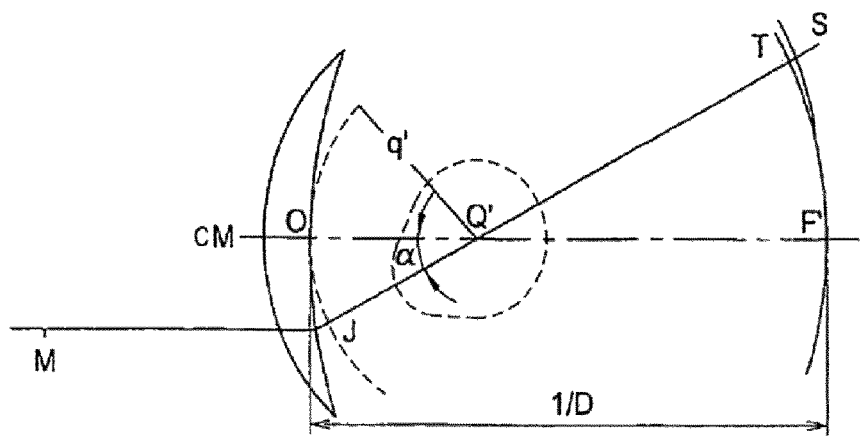
FIG. 1 is a diagram of a lens/eye optical system, seen from the side.

Conventionally, optical quantities, namely power and astigmatism, are defined for a given lens under the conditions in which it is to be worn. FIG. 1 shows a diagram of a lens/eye optical system seen from the side, and shows the definitions used in the rest of the description based on an example of a progressive multifocal ophthalmic lens having a front complex surface.

The center of rotation of the eye is called Q'. The axis Q'F' shown in the figure by the dot/dash line is the horizontal axis passing through the center of rotation of the eye Q' and extending in front of the wearer; in other words the axis Q'F' corresponds to the primary viewing direction. This axis intersects the front face of the lens at a point called the fitting cross CM. The fitting cross is marked on lenses in order to allow them to be positioned by an optician. The fitting cross is generally located 4 mm above the geometric center of the front face of the lens.

A apex sphere also called vertex sphere, with center Q' and radius q', is defined, as the sphere that cuts the rear face of the lens at the point O corresponding to the intersection by the axis Q'F' of the rear face of the lens.

As an example, a value of the radius q' of 25.5 mm corresponds to a standard value and provides satisfactory results when the lenses are worn.

A given viewing direction-shown by the solid line in FIG. 1, corresponds to a position of the eye rotating about Q' and to a point J on the apex sphere.

A viewing direction may also be identified, in spherical coordinates, by two angles $\alpha$ and $\beta$, in the so called Fick system.

The angle $\alpha$ is the angle between the Q'F' axis and the projection of the straight line Q'J on the vertical plane containing the Q'F' axis, this angle appearing in the diagram of FIG. 1.

The angle $\beta$ is the angle between the Q'F' axis and the projection of the straight line Q'J on the horizontal plane containing the Q'F' axis. A given viewing direction therefore corresponds to a point J on the apex sphere or to a coordinate pair $(\alpha,\beta)$.

In a given viewing direction, the image of a point M in the object space, located at a given object distance, is formed between two points S and T corresponding to minimum and maximum distances JS and JT (which would be the sagittal and tangential focal lengths in the case of surfaces of revolution and of a point M at infinity).

In the example of FIG. 1, the image of a point in the object space at infinity is formed, on the Q'F' axis, at the point F'. The points S and T are coincident, which amounts to stating that the lens is locally spherical in the primary viewing direction. The distance D is the rear frontal plane of the lens.

Figure 2:
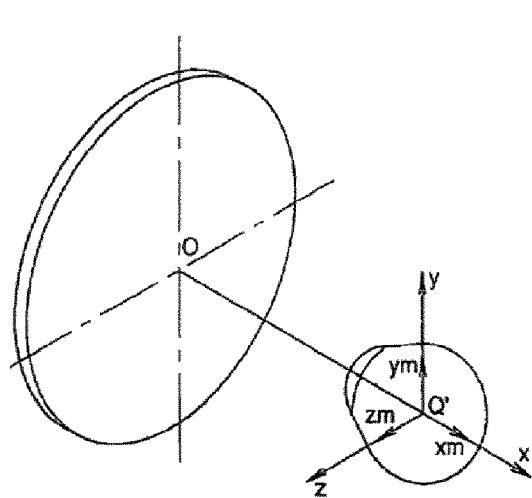
FIGS. 2 and 3 are perspective diagrams of a lens/eye system.
Figure 3:
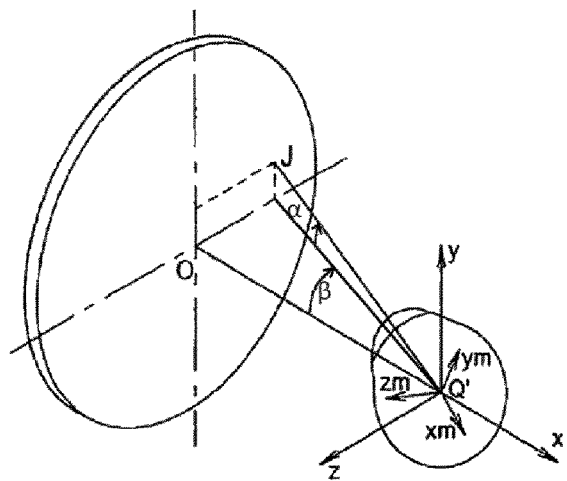

FIGS. 2 and 3 show perspective diagrams of a lens/eye system.

FIG. 2 shows the position of the eye and the reference frame associated with the eye, in the principal viewing direction, $\alpha=\beta=0$, called the primary viewing direction. The points J and O are then coincident.

FIG. 3 shows the position of the eye and the reference frame that is associated therewith in a direction $(\alpha,\beta)$.

Shown in FIGS. 2 and 3 are a fixed reference frame $\{x,y,z\}$ and a reference frame $\{xm,ym,zm\}$ associated with the eye in order to show clearly the rotation of the eye. The reference frame $\{x,y,z\}$ has as origin the point Q' and the x-axis is the Q'F' axis—the point F' not being shown in FIGS. 2 and 3 and passes through the point O. This axis is directed from the lens to the eye in correspondence with the direction of measurement of the astigmatism axis. The $\{y,z\}$ plane is the vertical plane. The y-axis is vertical and directed upwards. The z-axis is horizontal, the reference frame being a direct orthonormal coordinate system. The reference frame $\{xm,ym,zm\}$ associated with the eye has the point Q' as center. The xm axis is defined by the viewing direction JQ', and coincides with the $\{x,y,z\}$ reference frame in the case of the primary viewing direction. Listing's law gives the relationships between the $\{x,y,z\}$ and $\{xm,ym,zm\}$ coordinate systems for each viewing direction-see Le Grand, Optique Physiologique, Volume 1, published by Revue d'Optique, Paris 1965.

The section of the lens may be drawn in the (O,x,y) plane defined with reference to FIG. 2. The tangent to this curve at the point O is inclined to the (O,y) axis at an angle called the pantoscopic angle.

It is also possible to draw the cut of the lens in the (O,x,z) plane. The tangent to this curve at the point O is inclined to the (O,z) axis at what is called the wrap angle.

Using these elements, it is possible to define a wearer optical power and astigmatism under usual wearing conditions, in each viewing direction.

An object point M at an object distance given by the ergorama is considered for a gaze direction $(\alpha,\beta)$.

The ergorama is a function associating to each gaze direction the usual distance of an object point. Typically, in far vision following the primary gaze direction, the object point is at infinity. In near vision, following a gaze direction essentially corresponding to an angle $\alpha$ of the order of 36.6° and to an angle $\beta$ of the order of 6° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

An object proximity ProxO is defined for the point M on the corresponding light ray in the object space as the inverse of the distance MJ between point M and point J of the apex sphere:

$$ProxO = \frac{1}{MJ} \tag{1}$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction ($\alpha,\beta$), the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right) \quad (2)$$

By analogy with the case of a thin lens, it can therefore be defined, for a given gaze direction and for a given object proximity, i.e. for a point of the object space on the corresponding light ray, an optical power Pui as the sum of the image proximity and the object proximity, i.e.

$$Pui = ProxO + ProxI \quad (3)$$

With the same notations, an astigmatism Ast is defined for every gaze direction and for a given object proximity as:

$$Ast = \left|\frac{1}{JT} - \frac{1}{JS}\right| \quad (4)$$

This definition corresponds to the astigmatism of a ray beam created by the lens.

Possible definitions of the optical power and the astigmatism of the lens, in usual wearing conditions, can be calculated as explained in the article by B. Bourdoncle et al., entitled *"Ray tracing through progressive ophthalmic lenses"*, 1990 *International Lens Design Conference*, D. T. Moore ed., *Proc. Soc. Photo. Opt. Instrum. Eng.*

The prescription in ophthalmic field may comprise, in addition to the power prescription, an astigmatism prescription. Such a prescription is composed of an axis value (in degrees) and a module value (in diopters). The module value represents the difference between the maximal and minimal power in a given direction allowing to correct the visual default of a wearer. Following the convention, the axis represents the orientation of one of the two powers versus a reference axis and following a given rotation direction. TABO convention may be used. In this convention the reference axis is horizontal and the rotation direction is counterclockwise when looking at the wearer. A 45° axis corresponds to an axis orientated obliquely linking, when looking at the wearer, the upper right quadrant to the lower left quadrant. Such an astigmatism prescription is measured for the wearer in far vision. The term 'astigmatism' is used to refer to the couple (module, axis). That term is sometimes used to designate simply the module. The skilled person easily understands what it refers to depending on the context. The skilled person is also aware that the power/astigmatism prescription for a wearer is commonly described with the terms sphere, cylinder and axis.

Figure 4:
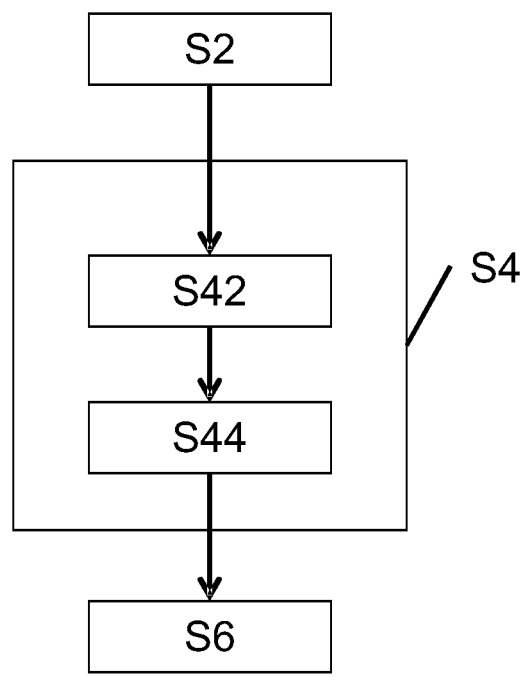
FIG. 4 is an illustration of a chart-flow of a method for determining optical parameters of an eye of a person according to the invention.

With reference to FIG. 4, the method comprises at least the following steps:
a displaying step S2,
an adapting step S4, and
a determining step S6.

During the displaying step S2, three sharp images are displayed on a retina of the eye of the person carried by three light beams. In other words, each sharp image is carried by an associated light beam focused substantially in the plane of a pupil of the eye.

In the sense of the invention, the light beams are focused substantially in the plane means that the light beams are focused at a maximum distance of 10 mm from the plane of the pupil ensuring the sharp display of images on the retina.

The three light beams are focused substantially in the plane of the pupil of the eye at three different positions also called "focusing points".

Thus, each focusing point of the pupil acts as a picoprojector which emits light towards the retina. The focusing of a plurality of light beams in the plane of a pupil of the eye at different positions allows increasing the size of the eye motion box (EMB) and is the basis of pupil extension.

Such displaying step S2 may be implemented using a head-mounted display device as disclosed in US2016/033771 A1. Indeed, the operating principle of the head-mounted display device of US2016/033771 A1 is based on picoprojectors whose emitted light is reflected towards the eye by a holographic mirror. More precisely, this light is focused substantially in the plane of the wearer's pupil (see FIGS. 2A and 2B of US2016/033771 A1). This results in a very small eye motion box. To increase the size of the eye motion box, a holographic mirror focuses the light from the picoprojector at N different positions (see FIGS. 3A and 3B of US2016/033771 A1, where N=2), each position corresponding to a specific wavelength. These wavelengths are very close to each other, so that the wearer cannot perceive a difference.

Alternatively, such displaying step S2 may also be implemented using a head-mounted display device as disclosed in WO2018/091984 A1, which is based on a light field display (LFD).

Each of the three images displayed during the displaying step S2 comprises a target. The target is for example a point or a symbol like a cross.

Figure 5:
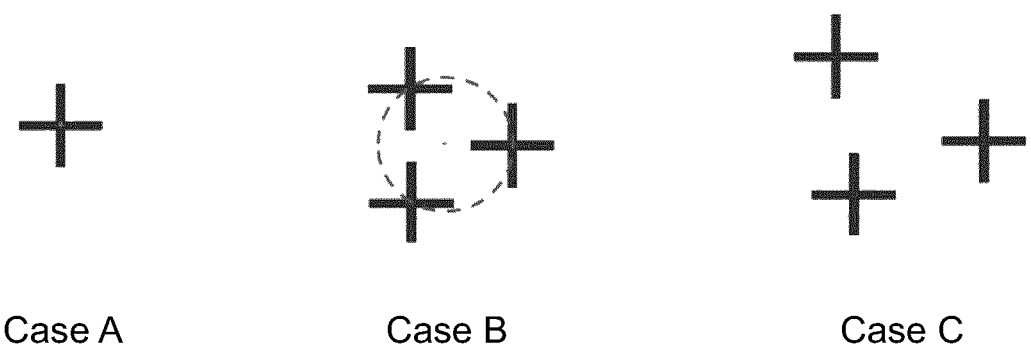
FIG. 5 illustrates resulting images as seen by a person having different visual defects.

FIG. 5 illustrates the resulting images as seen by persons having different visual defects in the case where the three sharp images displayed are the same and each comprises a cross localized at the same position in each image.

For simplicity's sake let us consider that the three focusing points are equally distant from the centre of the pupil, and equally distant from each other.

If the person is emmetropic, the person sees a single cross in his/her central vision as illustrated on the left of the FIG. 5 (Case A). But if the person is myopic or hyperopic, the person sees three distinct crosses, as illustrated at the center of the FIG. 5 (Case B), whose relative distance is a function of its spherical prescription. Finally, if the person is astigmatic, the person sees also three distinct crosses, as shown on the left of FIG. 5 (Case C), whose relative horizontal and vertical distances are linked to its cylindrical prescription.

Figure 6:
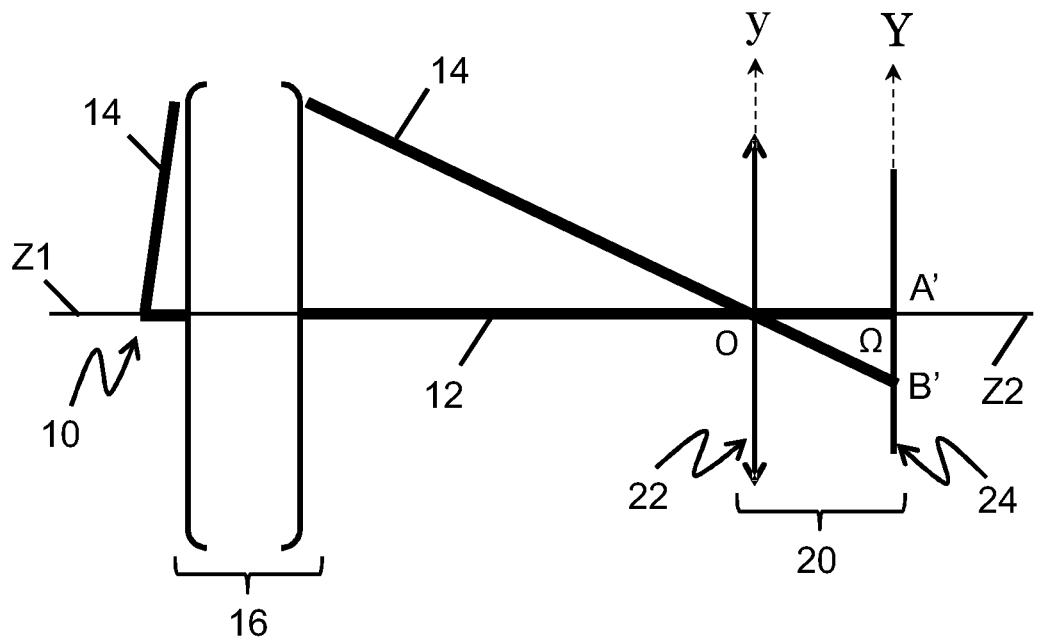
FIGS. 6 and 7 illustrate an image formation using a picoprojector respectively without and with a shift between the eye pupil and the optical axis of the picoprojector for an emmetropic eye.
Figure 7:
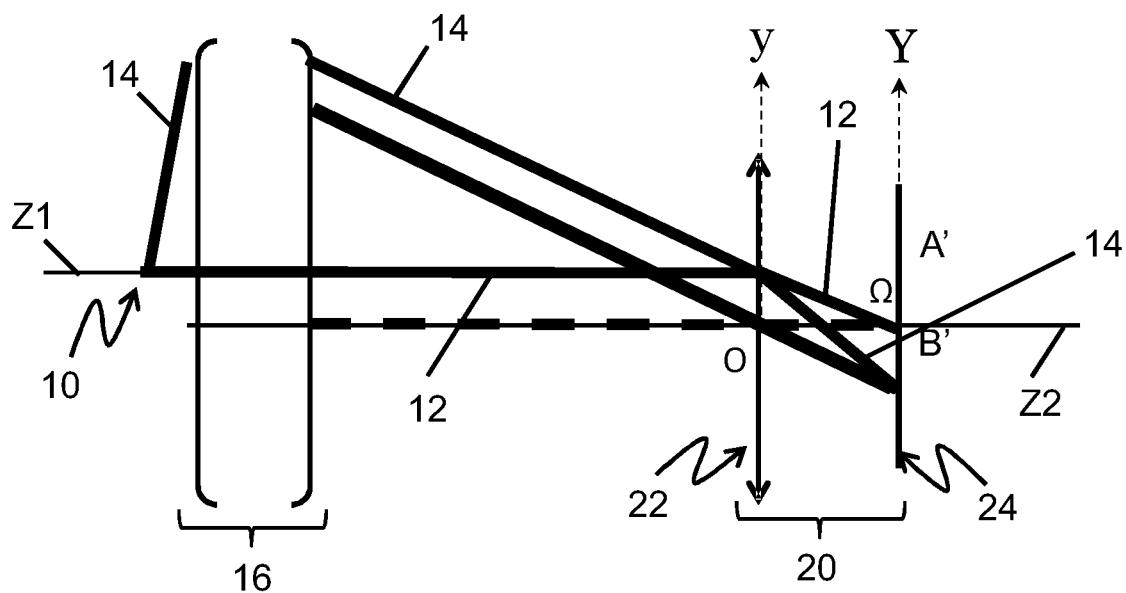

These differences can be explained with regard to FIGS. 6 to 9, illustrating a picoprojector 10 emitting two light rays 12, 14 (only two for simplicity's sake) crossing an optical system 16, represented by the black brackets, towards an eye 20 comprising a pupil 22 and a retina 24. FIGS. 6 and 7 relate to an emmetropic eye while FIGS. 8 and 9 relate to an ametropic eye, for example a myopic eye.

The optical system 16 is configured to focus the light rays emitted by the picoprojector substantially in the plane of the pupil 22.

On FIG. 6, when the optical axis Z1 of the picoprojector 10 is coincident with the optical axis Z2 of the eye 20, both light rays 12, 14 focus at the centre of the eye pupil and then form two points A' and B' on the retina 24.

As illustrated on FIG. 7, when the optical axis Z2 of the eye 20 is shifted in relation to the optical axis Z1 of the picoprojector 10, the position of points A' and B' will not change on the retina 24 because the eye is emmetropic.

Figure 8:
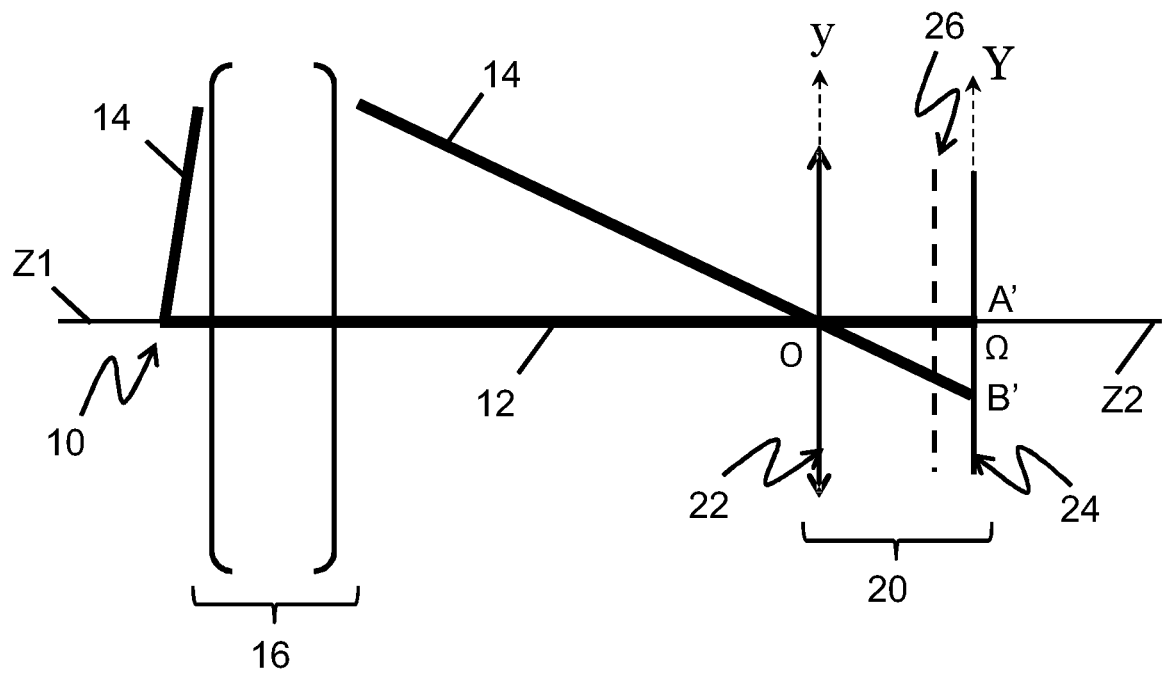
FIGS. 8 and 9 illustrate an image formation using a picoprojector respectively without and with a shift between the eye pupil and the optical axis of the picoprojector for an myopic eye.
Figure 9:
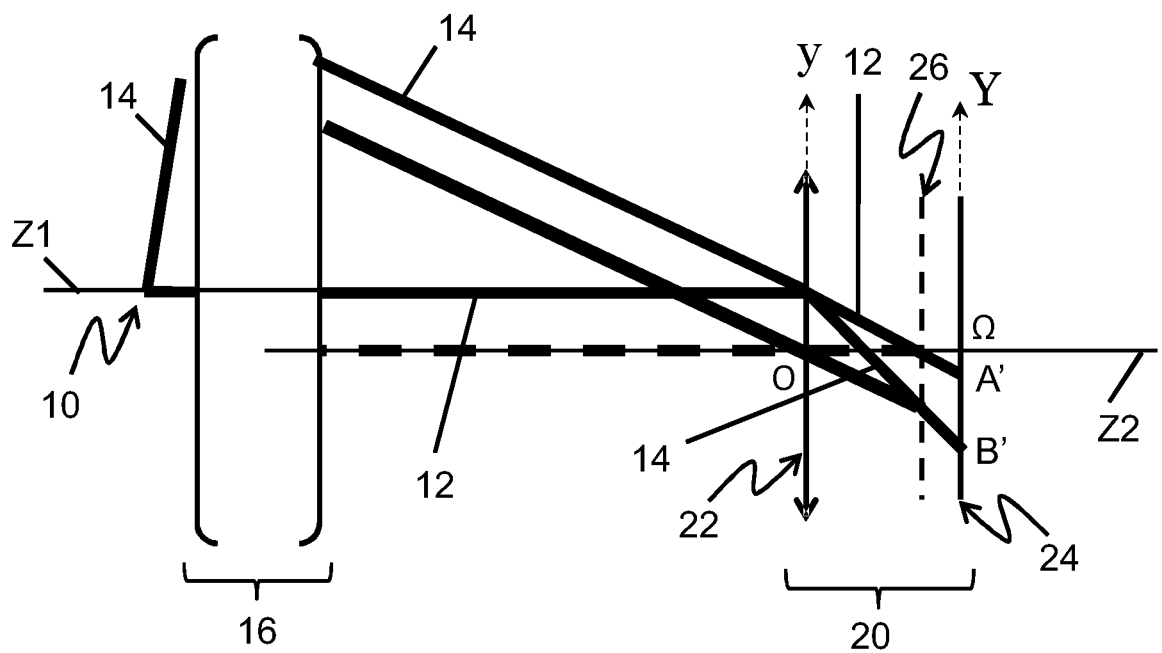

However, for a myopic eye as illustrated on FIGS. 8 and 9, light coming from infinity focuses in the dotted plane 26 instead of the retina. Such dotted plane 26 is located before the retina 24 of the eye.

Thus, with reference to FIG. 8, considering again a single picoprojector 10 focusing at the centre of the eye pupil 22, a sharp image is still displayed on the retina 34.

But, when the optical axis Z2 of the eye is shifted in relation to the optical axis Z1 of the picoprojector 10, the position of points A' and B' are shifted on the retina 24 for the myopic eye as illustrated on FIG. 9.

As a result, if the person is myopic, light from two picoprojectors displaying the same content will reach the retina at different locations, and the image is no longer sharp on the retina. Instead, two images are shifted and superimposed. And there are as many images as there are focusing points on the eye pupil.

Of course, same observations apply to hyperopic wearers and also to astigmatic wearers.

Then, a parameter of the target in each image is adapted based on feedback of the person relative to the change of the parameter of the target in the image during the step S4.

Figure 10:
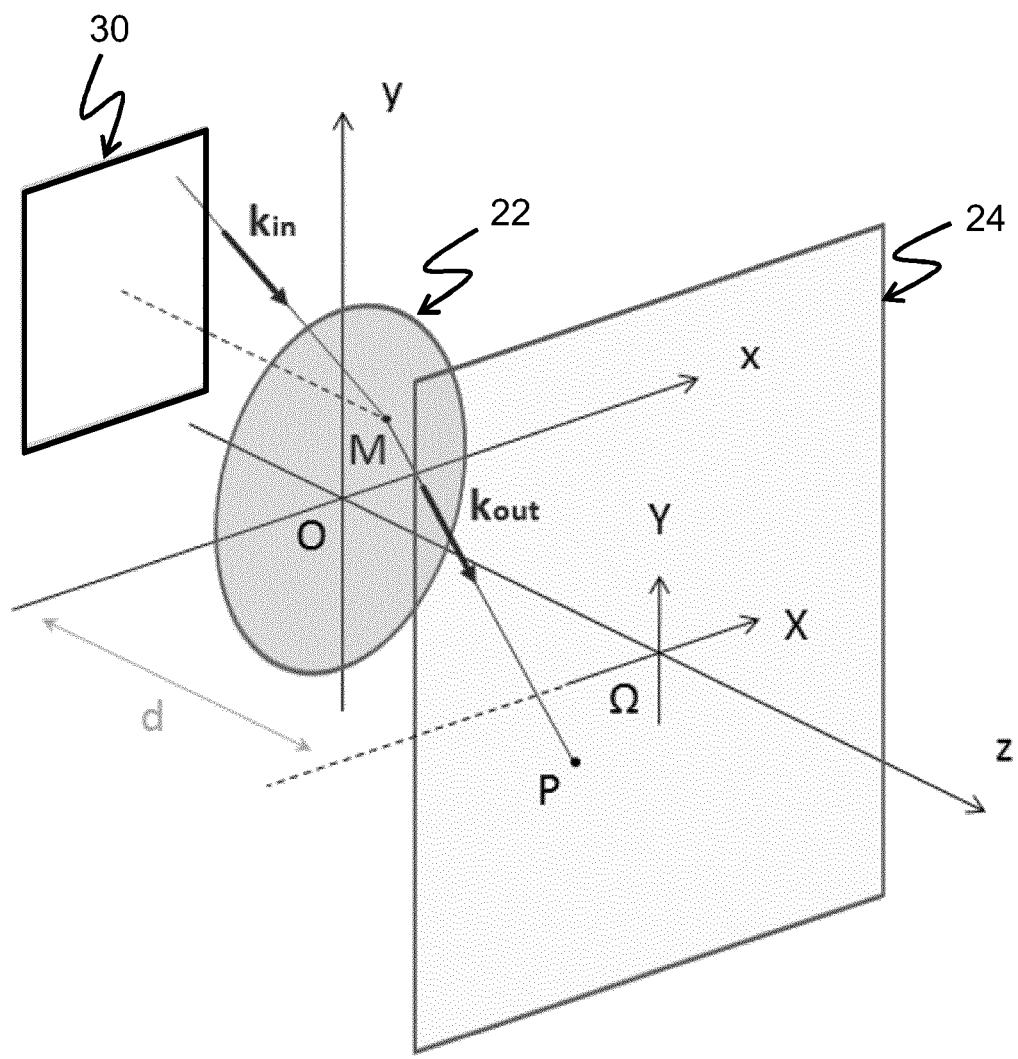
FIG. 10 is an illustration of a schematic eye model.

Indeed, with reference to the schematic eye model illustrated on FIG. 10, a ray directed by wave vector $k_{in}$ coming from the half space in front of the eye and hitting the plane of the pupil 22 (Oxy) at point M is refracted into a wave vector $k_{out}$ by the phase function of the eye when crossing the eye of the pupil and hits the retina 24 at point P.

Point M corresponds to a "focusing point", and the sum of $k_{in}$ vectors correspond to the image content, represented by a square frame 30 in FIG. 10. The sum of all points P corresponding to all vectors $k_{in}$ depict the image generated on the retina.

The coordinates (X,Y) of point P can be determined as follows:

$$\binom{X}{Y} = \frac{d}{c}\binom{a}{b} + \left[1 - \frac{d}{c}\left(\frac{1}{d} + S_{eq}\right)\right]\binom{x}{y} + \frac{d}{c}\frac{C\sin(2\theta)}{2}\binom{x}{y} + \frac{d}{c}\frac{C\cos(2\theta)}{2}\binom{x}{-y} \quad (5)$$

where:
- d is the distance between the plane of the pupil (Oxy) and the retina considered as a plane (ΩXY) for simplicity's sake,
- (x, y) are the coordinates of point M in the plane of the pupil,
- (ka, kb, kc) are the coordinates of the wave vector $k_{in}$, with k=2π/λ, λ is the wavelength and c=$\sqrt{a^2+b^2}$,
- $S_{eq}$=S+C/2 with S the maximum dioptric power, C≤0 the astigmatism and 0≤θ≤180° the axis.

Thus, in the paraxial approximation implying d/c≈d, the differences of positions between two points P1 and P2 of the retina, corresponding to two points M1 and M2 lit by corresponding wave vectors $k_{in,1}$ and $k_{in,2}$ is expressed by:

$$\binom{X_2-X_1}{Y_2-Y_1} = d\binom{a_2-a_1}{b_2-b_1} - dS_{eq}\binom{x_2-x_1}{y_2-y_1} + \quad (6)$$

-continued
$$d\frac{C\sin(2\theta)}{2}\binom{y_2-y_1}{x_2-x_1} + d\frac{C\cos(2\theta)}{2}\binom{x_2-x_1}{y_1-y_2}$$

Thus, when two focusing points M1 and M2 of the pupil are lit by two different rays, the difference of positions of the corresponding points P1 and P2 on the retina depends on the difference of inclination of these rays and on the differences of positions of the focusing points M1 and M2 on the pupil and not on the absolute positions of M1 and M2 on the pupil. Thus, the simultaneous displacement of the focusing points M1 and M2, with the same incident ray directions, only results in a shift of P1 and P2 on the retina.

To this end, at each iteration, the parameter of the target in each image is modified and the person provides his/her feedback relative to this change.

The feedback of the person is preferably a vocal feedback, for example provided by answering to questions, for example asking the person if the targets projected on his/her retina are closer or further to each other from an iteration to the following one or other similar questions.

Furthermore, the feedback of the person may be a haptic feedback.

Advantageously, the adapted parameter of the target is preferably the relative position of the target in each image. In this case, the step S4 for adapting a parameter of the target in each image comprises at least a step S42 for adapting a horizontal position of the target of an image and a step S44 for adapting a vertical position of the target of an image.

During the step S42, the horizontal angular position of the target of an image carried by one of the light beams is adapted until the target of the image and the target of another image carried by another of the light beams are seen by the person with the same horizontal position in the displayed images on the retina of the eye.

In the same way, during the step S44, the vertical angular position of the target of an image carried by one of the light beams is adapted until the target of the image and the target of another image carried by another of the light beams are seen by the person with the same vertical position in the displayed images on the retina of the eye.

Thus, during implementation of steps S42 and S44, the values of horizontal and vertical angular position of the target in the images are changed at each iteration to the response of the person when asked if two points of the target projected on his retina are closer or further to each other from an iteration to the following one and this until both targets are seen superimposed by the person, i.e. with the same vertical position and the same horizontal position in the displayed images on the retina of the eye. For visibility's sake, these points can correspond to the center of symbols like crosses for instance.

For example, the crosses can be shifted pixel by pixel in the horizontal and/or in the vertical directions at each iteration.

Advantageously, such method does not require the eye to be totally motionless in relation to the focusing points. The only requirement is that the focusing points are contained in the eye's pupil.

According to a preferred embodiment, the displaying step S2 and the adapting step S4 may be carried out sequentially, i.e. for two of the three light beams and then repeated when the third light beam is added. Indeed, during the displaying step S2, two sharp images are firstly displayed on the retina of the eye of the person carried by two light beams. For both images, a parameter of the target in each image is adapted based on feedback of the person relative to the change of the parameter of the target in the image during the step S4, preferably until the targets of both images are seen by the person with the same position in the displayed images on the retina of the eye. Then, the third sharp image is also displayed on the retina carried by a third light beam and a parameter of the target in the third image is adapted based on feedback of the person relative to the change of the parameter of the target in the image during the step S4, preferably until the targets of the third image and one of the first images are seen by the person with the same position in the displayed images on the retina of the eye.

During the determining step S6, the optical parameter of the person's eye is determined based on the adaption of the parameter of the target in each image.

Indeed, from the changes of the horizontal angular position and the vertical angular position of the target in the images necessary for the person to see only one cross, the optical parameters of the person's eye can be determined.

In other words, from the difference between the initial and final angular positions of the target in the images, in both horizontal and vertical directions, and knowing the positions of the focusing points and a function linking the angular deviation perceived by the person and the real angular deviation of the target in the image, the optical parameters of the person's eye can be determined. The initial position of the target in the images corresponds to the setting of the display device for an emmetropic eye. The final position of the target in the images corresponds to the setting of the display device when adapted to a non-emmetropic person, i.e. when the person sees both targets superimposed.

Indeed, once $(a_1, b_1)$ and $(a_2, b_2)$ are known, the expression (6) leads to two equations for finding the three variables S, C and θ. So, by introducing a third point M3, at least two more equations can be expressed from expression (6), allowing the determination of the three optical parameters S, C and θ.

The position of the focusing points can be beforehand determined during a calibration step.

For example, let us consider that the person is myopic and astigmatic with spherical power error S, cylindrical power C and axis 0°. So, horizontal power error is Sh=S, and vertical power error is Sv=S+C, horizontal and vertical power being the extremum powers, expressed in diopters (δ).

Using a model allowing to link prismatic deviation (in prismatic diopters(Δ) and the spherical power error, for example the Prentice's law, the angular deviation perceived by the person between crosses 'i' and 'j' in both horizontal and vertical directions can be expressed:

$$\begin{cases} P_{\Delta,h}(i,j) = d_h(i,j) \times \dfrac{Sh}{10} \\ P_{\Delta,v}(i,j) = d_v(i,j) \times \dfrac{Sv}{10} \end{cases} \quad (7)$$

where:
- $d_h(i,j)$ is the horizontal distance between focusing point displaying cross 'i' and focusing point displaying cross 'j' (expressed in mm);
- $d_v(i,j)$ is the vertical distance between focusing point displaying cross 'i' and focusing point displaying cross 'j' (expressed in mm);

Thus, if a shift of $n_h(i,j)$ pixels of cross 'j' is necessary to superimposed crosses 'i' and 'j' in the horizontal direction and a shift of $n_v(i,j)$ pixels of cross 'j' is necessary to superimposed crosses 'i' and 'j' in the horizontal direction and in the vertical direction and knowing the angular size of a pixel $dP_\Delta$, which is a build parameter, the angular deviation perceived by the person between crosses 'i' and 'j' in both horizontal and vertical directions can also be expressed:

$$\begin{cases} P_{\Delta,h}(i,j) = n_h(i,j) \times dP_\Delta \\ P_{\Delta,v}(i,j) = n_v(i,j) \times dP_\Delta \end{cases} \quad (8)$$

From equations (7) and (8), the spherical power error S and the cylindrical power C for the eye of the person are determined.

Of course, such determination can be generalized to prescription having non zero cylinder axis.

Likewise, models other than the Prentice's law can be used to determine the optical parameters of the eye of the person.

While in this embodiment for determining optical parameters relative to power and astigmatism prescriptions of the eye of the person, three sharp images are displayed on the retina of the eye of the person carried by three light beams focused in three different points in the plane of a pupil of the eye, it can be noted that a plurality of sharp images can be displayed on the retina carried by a plurality of associated light beams focused in a plurality of different points in the plane of a pupil of the eye allowing a more accurate determination of the optical parameters relative to its prescriptions.

In addition, the determination of the sphere only, if the cylinder is null requires only the display of two sharp images on the retina of the eye carried by two light beams focused at two different points in the plane of the pupil of the eye.

Of course, while in this embodiment the focusing points are equally distant from the centre of the pupil and equally distant from each other, the method can be generalized to other display device configured to display a plurality of sharp images on the retina of an eye carried by a plurality of associated light beams focused in a plurality of different points in the plane of a pupil of the eye and wherein the focusing points are not equally distant from the center of the eye's pupil and/or not equally distant from each other. In this case, the position of the focusing points should be beforehand determined during a calibration step.

Figure 11:
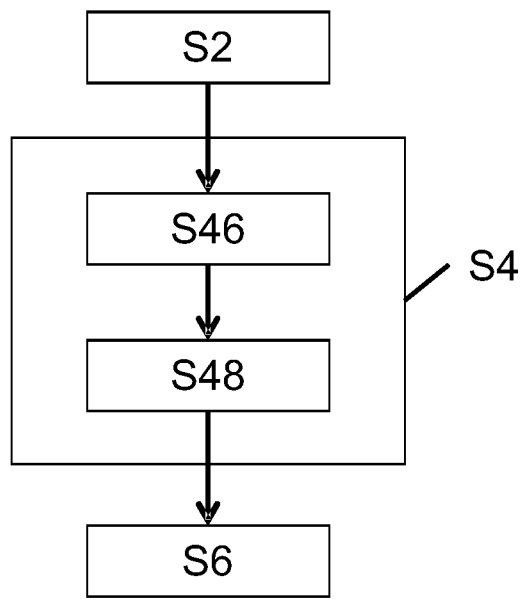
FIG. 11 is an illustration of a chart-flow of a method for determining optical parameters of an eye of a person according to another embodiment of the invention.

With reference to FIG. 11, another embodiment of the method differs from the previous one in that the adapted parameter of the target is the size of the target in each image instead of the relative position of the target in each image. In this embodiment, the position and the size of the target is the same in each displayed image initially.

In that case, the step S4 for adapting a parameter of the target in each image comprises a step S46 for adapting in a horizontal direction and a step S48 for adapting in a vertical direction.

During the step S46 for adapting in a horizontal direction, the size of the target of an image carried by one of the light beams is adapted in a horizontal direction until the target of the image and the target of another image carried by another of the light beams are seen by the person touching each other in the horizontal direction in the displayed images on the retina of the eye.

In the same way, during the step S48 for adapting in a horizontal direction, the size of the target of an image carried by one of the light beams is adapted in a vertical direction until the target of the image and the target of another image carried by another of the light beams are seen by the person touching each other in the vertical direction in the displayed images on the retina of the eye.

As indicated hereinbefore, the method is preferably implemented using a head-mounted device adapted to at least display a plurality of sharp images on the retina of the eye of the person, the plurality of images being carried by a plurality of light beams focused substantially in the plan of the pupil of the eye at different positions. For example the head mounted display devices disclosed in US 2016/033771 A1 or in WO 2018/091984 A1 may be used to implement the method according to the invention.

To this end, a computer program product may be stored in a memory of the head mounted display device, the computer program product comprising one or more stored sequences of instructions that are accessible to a processor of the head mounted display device and which, when executed by the processor, causes the processor to carry out steps of the method according to the invention.

Another object of the invention relates to a method for displaying a sharp image on a retina of an eye of a person, the person having a prescription for this eye.

As for the previous method, such displaying method is preferably implemented using a head-mounted device adapted to at least display a plurality of sharp images on the retina of the eye of the person, the plurality of images being carried by a plurality of light beams focused substantially in the plan of the pupil of the eye at different positions.

In the same manner, a computer program product may be stored in a memory of the head mounted display device, the computer program product comprising one or more stored sequences of instructions that are accessible to a processor of the head mounted display device and which, when executed by the processor, causes the processor to carry out steps of the method according to the invention and as described hereinafter.

Figure 12:
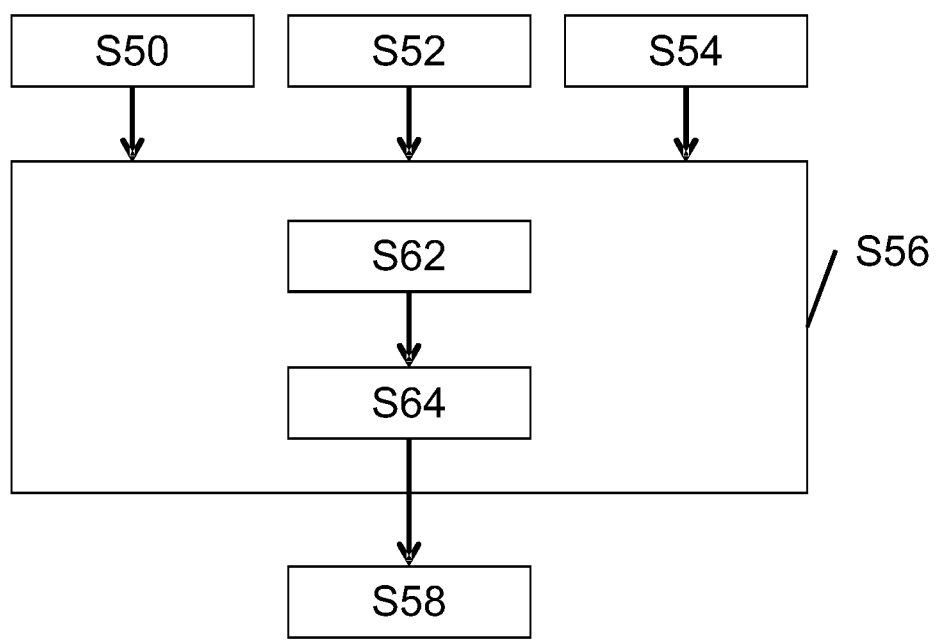
FIG. 12 is an illustration of a chart-flow of a method for displaying a sharp image on a retina of an eye of a person according to the invention.

With reference to FIG. 12, the displaying method comprises at least the following steps:
a parameter determining step S50,
a sub-images providing step S52,
a display device providing step S54,
an adapting step S56, and
a displaying step S58.

During the parameter determining step S50, at least one optical parameter relative to the prescription for the eye of the person is determined advantageously according to the previous method and using an adapted head mounted display device as disclosed in US 2016/033771 A1 or in WO 2018/091984 A1.

A plurality of initial sub-images is provided during the sub-images providing step S52. Each initial sub-image corresponds to at least a part of the image to be displayed.

In S54, a plurality of light beams is provided. The light beams are configured to be focused substantially in the plane of a pupil of the eye at a plurality of corresponding different positions. In the sense of the invention, the light beams are focused substantially in the plane means that the light beams are focused at a maximum distance of 10 mm from the plane of the pupil ensuring the sharp display of images on the retina.

In addition, each light beam is configured to carry an associated sub-image.

Then for each sub-image, the sub-image is adapted based on the at least one provided optical parameter and on the corresponding focused position of the light beam configured to carry the sub-image to form an adapted sub-image during the adapting step S56.

Thus, each sub-image is calculated according to the wearer's needs, i.e. according to the eye's prescription.

Preferably, adapting the sub-image comprises adapting the relative position of the sub-image in the image to be displayed. Adapting the relative position of the sub-image in the image to be displayed comprises:
a horizontal adapting step S62, and
a vertical adapting step S64.

During this horizontal adapting step S62, a horizontal angular position of the sub-image carried by the associated light beam is adapted based on the at least one provided optical parameter and on the corresponding focused position of the associated light beam.

Similarly, a vertical angular position of the sub-image carried by the associated light beam is adapted based on the provided optical parameters and on the corresponding focused position of the associated light beam during the vertical adapting step S64.

The focused position in the plan of the pupil of the eye may be determined for each light beam during a calibration step.

During the displaying step S58, each adapted sub-image carried by the associated light beam is displayed on the retina of the person.

The shifting of all the pixels of each sub-image based on the optical parameters of the person's eye allows the sub-images coming from the plurality of focusing points to be superimposed properly. The sub-images coming from the plurality of focusing point are thus seen as a single sharp image by the person.

Figure 13:
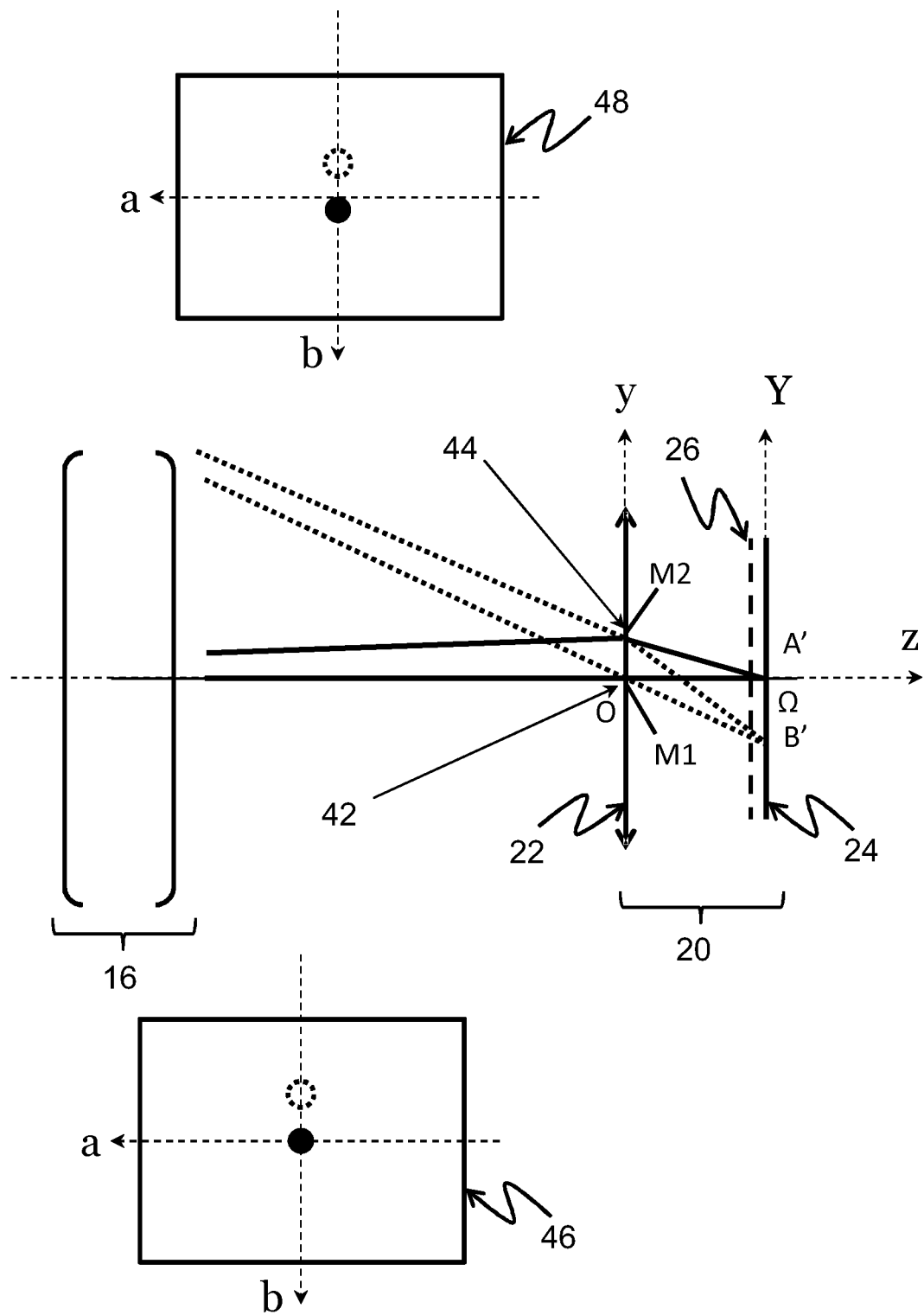
FIG. 13 illustrates an image formation using two picoprojectors respectively according to a method for displaying a sharp image on a retina of an eye of an ametropic person, for example a myopic person.

FIG. 13 illustrates such method for displaying a sharp image on a retina of an eye of an ametropic person, for example a myopic person. In this example, let us consider that an image content to be displayed (represented by a square frame 30 in FIG. 10) comprises two discs, one black and one white, aligned vertically.

In addition, only two light beams 42, 44 coming from two picoprojectors, for simplicity's sake, are illustrated focusing substantially in the plane Oxy of the pupil at two corresponding focusing points M1 and M2, aligned on the Oy axis in the example. A first light beam 42 carries an associated sub-image represented by a square frame 46 and a second light beam carries an associated sub-image represented by a square frame 48.

Each sub-image is calculated and adapted according to the prescription of the eye of the person and on the corresponding focused position of the light beam. Thus, the content of the first second image and the second sub-image in their frame are vertically offset from each other allowing the properly superimposition on the retina of the first and second sub-images coming from the focusing points M1 and M2.

The adapted sub-images may be displayed sequentially or simultaneously on the retina of the person.

According to a preferred embodiment, the focused positions of the plurality of light beams are regularly distant from each other in the plan of the pupil of the eye.

According to another embodiment, compatible with the previous ones, a wavelength of at least one of the plurality of light beams differs from a wavelength of at least one other of the plurality of light beams. Preferably, the wavelengths are very close to each other so that the person cannot perceive a difference in the image color.

Advantageously, such method allows customizing a head-mounted display device to the user's viewing ability. Indeed, such method allows a pre-compensation of the image to be displayed on the retina of the user based on the prescription of the eye of the user, so as to display a sharp image on the retina of the user.

Consequently, a single head-mounted device could be used by different persons having different prescription, the image to be displayed on the retina of each person being corrected based on a prescription of the eye of the person determined by the same head-mounted device.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining at least one optical parameter of an eye of a person comprising:
    displaying at least two focused images on a retina of the eye of the person, the at least two images including a target and being carried by two light beams focused substantially in a plane of a pupil of the eye at at least two different positions;
    adapting a parameter of the target in each image based on feedback of the person relative to change of the parameter of the target in the image; and
    determining the at least one optical parameter of the person's eye based on the adaption of the parameter of the target in each image,
    wherein at least three focused images are displayed on the retina of the eye of the person, the at least three images including a target and being carried by three light beams focused substantially in the plane of the pupil of the eye at at least three different positions and three optical parameters based on the adaption of the parameter of the target in each focused content are determined.

2. The method according to claim 1, further comprising adapting a parameter of the target in each image based on feedback of the person relative to the change of the parameter of the target in the image in order to superimpose the targets of the at least two focused images.

3. The method according to claim 1, wherein the adapted parameter of the target is the relative position of the target in each image.

4. The method according to claim 3, wherein adapting a parameter of the target in each image further comprises:
    adapting a horizontal angular position of the target of an image carried by one of the light beams until the target of the image and the target of another image carried by another of the light beams are seen by the person with the same horizontal position in the displayed images on the retina of the eye; and
    adapting a vertical angular position of the target of an image carried by one of the light beams until the target of the image and the target of another image carried by another of the light beams are seen by the person with the same vertical position in the displayed images on the retina of the eye.

5. The method according to claim 1, wherein the adapted parameter of the target is the size of the target in each image.

6. The method according to claim 5, wherein adapting a parameter of the target in each image further comprising:
    adapting a size of the target of an image carried by one of the light beams in a horizontal direction until the target of the image and the target of another image carried by another of the light beams are seen by the person touching each other in the horizontal direction in the displayed images on the retina of the eye; and
    adapting a size of the target of an image carried by one of the light beams in a vertical direction until the target of the image and the target of another image carried by another of the light beams are seen by the person touching each other in the vertical direction in the displayed images on the retina of the eye.

7. The method according to claim 1, wherein the determined optical parameters of the person's eye are relative to a dioptric power, an astigmatism and an axis of the eye of the person.

8. The method according to claim 1, wherein the feedback of the person is a haptic feedback.

9. The method according to claim 1, wherein the feedback of the person is a vocal feedback.

10. The method according to claim 9, wherein the feedback of the person is provided by answering to questions.

11. The method according to claim 1, wherein the method is implemented using a head-mounted device adapted to at least display a plurality of focused images on the retina of the eye of the person, the plurality of images being carried by a plurality of light beams focused substantially in the plane of the pupil of the eye at different positions.

12. A non-transitory computer readable medium having stored thereon a program product having one or more stored sequences of instructions that are accessible to a processor and which, when executed by the processor, causes the processor to implement a method comprising:
    displaying at least two focused images on a retina of an eye of a person, the at least two images including a target and being carried by two light beams focused substantially in a plane of a pupil of the eye at at least two different positions;
    adapting a parameter of the target in each image based on feedback of the person relative to change of the parameter of the target in the image; and
    determining at least one optical parameter of the person's eye based on the adaption of the parameter of the target in each image, and
    wherein at least three images are displayed on the retina of the eye of the person, the at least three images including a target and being carried by three light beams focused substantially in a plane of the pupil of the eye at at least three different positions and three optical parameters based on the adaption of the parameter of the target in each focused content are determined.

13. A method for displaying a focused image on a retina of an eye of a person, the person having a prescription for the eye of the person, the method comprising:
    determining at least one optical parameter relative to the prescription for the eye of the person;
    providing a plurality of initial sub-images, each initial sub-image corresponding to at least a part of the image to be displayed;

providing a plurality of light beams configured to be focused substantially in a plane of a pupil of the eye at a plurality of corresponding different positions, each light beam being configured to carry an associated sub-image;

for each sub-image, adapting the sub-image based on at least one provided optical parameter and on the corresponding focused position of the light beam configured to carry the sub-image to form an adapted sub-image; and displaying each adapted sub-image carried by an associated light beam on the retina of the person, wherein the determining the at least one optical parameter relative to the prescription for the eye of the person further includes:

displaying at least two focused images on a retina of the eye of the person, the at least two images including a target and being carried by two light beams focused substantially in a plane of a pupil of the eye at at least two different positions, adapting a parameter of the target in each image based on feedback of the person relative to the change of the parameter of the target in the image, and determining the at least one optical parameter of the person's eye based on the adaption of the parameter of the target in each image, and wherein at least three focused images are displayed on the retina of the eye of the person, the at least three images including a target and being carried by three light beams focused substantially in the plane of the pupil of the eye at at least three different positions and three optical parameters based on the adaption of the parameter of the target in each focused content are determined.

\* \* \* \* \*